May 10, 1966 M. V. ROODE 3,250,554
PLASTIC BEARING MEANS FOR THE INTERFACE OF A BALL
AND SOCKET JOINT
Filed Jan. 3, 1962 2 Sheets-Sheet 1
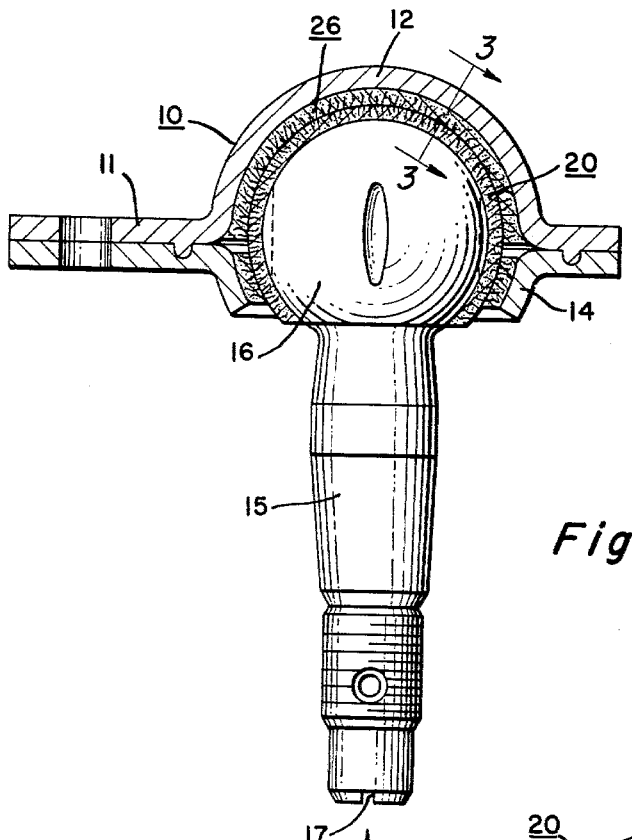
Fig. 1
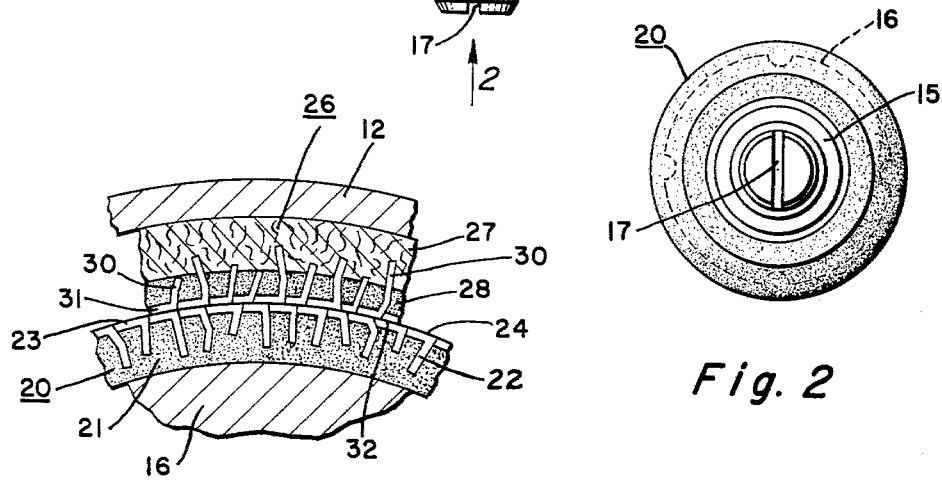
Fig. 2
Fig. 3
INVENTOR.
Melvin V. Roode
BY
Albert H. Reuther
His Attorney May 10, 1966     M. V. ROODE     3,250,554
PLASTIC BEARING MEANS FOR THE INTERFACE OF A BALL
AND SOCKET JOINT Filed Jan. 3, 1962     2 Sheets-Sheet 2

INVENTOR.
Melvin V. Roode
BY
Albert H. Reuther
His Attorney

United States Patent Office 3,250,554
Patented May 10, 1966

3,250,554
PLASTIC BEARING MEANS FOR THE INTERFACE
OF A BALL AND SOCKET JOINT
Melvin V. Roode, Dayton, Ohio, assignor to General
Motors Corporation, Detroit, Mich., a corporation of
Delaware
Filed Jan. 3, 1962, Ser. No. 164,009
1 Claim. (Cl. 287—87)

This invention relates to members relatively movable as to each other, and, more particularly, to wear enhancement of metal-free engagement of such members.

An object of this invention is to provide a new and improved plastic to plastic structure movable as to components thereof yet durable and strong for long substantially maintenance-free wear.

Another object of this invention is to provide a ball stud having an elongated metal body portion enlarged at one end to carry a molded-on angular portion of composite material finished directly to proper dimensions without costly grinding operation required for steel ball studs previously used yet having sufficient impact resistance and protection against corrosion of the enlarged end of the metal body portion to enhance wear life previously deleteriously affected by metal corrosion as a contributing factor in wear life.

Another object of this invention is to provide bearing means including a plastic to plastic surfacing engagement of parts at least one of which carries fiber-like low-friction particles at least partially embedded in a moldable resin material from which particles ends extend to permit orientation thereof as fiber-like low-friction particles have higher compressive strength and less "plastic cold flow" as well as serving as a lubricant-type filler to eliminate need for periodic grease supply thereto yet having improved wear characteristics.

A further object of this invention is to provide a ball joint assembly including a socket portion fitted with a plastic seat means having low-friction material in predetermined areas thereof engageable by a plastic covering having fiber-like low-friction particles at least partially embedded as well as oriented therewith and carried by an enlarged end of an elongated metal stud which is pivotally movable relative to the socket portion between cooperating surfacing of the plastic seat means and plastic covering to avoid danger of wear due to metal corrosion as well as obviating need for periodic lubrication thereof.

Another object of this invention is to provide a plastic to plastic bearing means having cooperable curved plastic members at least one of which includes a settable resin body portion of injection-moldable lubricant-filled thermoplastic acetal polymers and copolymers, polyamides, and polycarbonates wherein predetermined sizes of Teflon or polytetrafluoroethylene fiber-like as well as powdery particles, graphite or molybdenum disulfide can be used as a lubricant filler up to substantially 22% in Celcon (acetal copolymer), Delrin (acetal monopolymer or resin), nylon (polyamide), Lexan (polycarbonate), or Merlon (polycarbonate) injection molded to a predetermined curved shape to provide a low-friction, improved wear plastic bearing surface engageable with a molded thermosetting plastic bearing seat of formaldehyde-condensation products such as phenolic or melamine impregnated fibrous material such as cotton ducking and the like with or without Teflon fiber or graphited surfacing.

Further objects and advantages of the present invention will be apparent from the following description, reference being had to the accompanying drawings wherein preferred embodiments of the present invention are clearly shown.

In the drawings:

FIGURE 1 is a cross-sectional view of a ball joint assembly having features in accordance with the present invention.

FIGURE 2 is an end view of an elongated stud in the direction of arrow 2 in FIGURE 1.

FIGURE 3 is a fragmentary enlarged cross-sectional view taken along line 3—3 in FIGURE 1.

Figure 4:
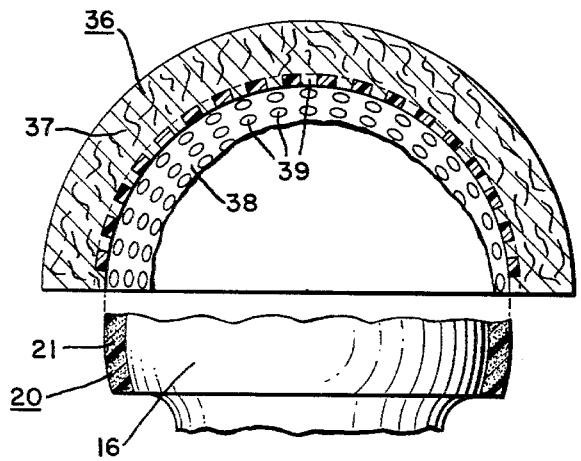
FIGURE 4 is a sectional view of a perforated interlocked with a backing portion to form a low-friction self-lubricating plastic bearing seat means engageable by a curved plastic covering molded onto an enlarged end of an elongated metal stud means journalled therewith.

Durability test results have indicated that abrasive action due to corrosion of metal ball studs can be a major contributing factor in the wear life of a ball joint. Such abrasiveness of a metal surface which has corroded or rusted due to moisture and other conditions can result in considerable damage to plastic liners or seats of ball joint sockets. Such corrosion can obviate finely honed or machined dimensional tolerances on a metal ball stud means.

A bearing means including a plastic to plastic surfacing engagement of parts can be seen in FIGURE 1 where there is shown a ball joint assembly generally indicated by numeral 10. This assembly includes a metal stamping 11 with a socket forming portion 12 complemented by an apertured part 14 held thereto by suitable fastening means such as bolts or welding. A ball stud means shown in views of FIGURES 1 and 2 includes an elongated metal body portion 15 enlarged at one end 16 and having a diametrically extending slot 17 at an opposite end can be positioned to be cooperable with the socket forming portion. The slot 17 is adapted to receive a tool such as a screwdriver for holding the stud means in a particular position when necessary to thread a bolt or other structure thereto during mounting thereof on a motor vehicle. The ball joint means can be mounted between movable parts or members of a motor vehicle and in accordance with the present invention, an improved plastic to plastic structure is provided between the enlarged end 16 and the socket forming portion 12 of the ball joint means.

The enlarged end 16 of the ball stud means has a plastic covering generally indicated by numeral 20 in FIGURE 1 and illustrated in further detail in a cross-sectional view of FIGURE 3. This covering 20 extends coextensively in a curved shape at least semi-spherically over the enlarged end 16. The covering 20 comprises a body 21 of moldable resin material in which lubricant-filler particles 22 are embedded with ends 23 of the particles collectively forming a plastic bearing surface 24 generally arcuate in shape. The body 21 of resin can include an injection-moldable thermoplastic of acetal polymers and copolymers, polyamides, and polycarbonates wherein the particles 22 with ends 23 thereof serve as permanent lubricant fillers. For example, polytetrafluoroethylene or Teflon fibers and powders as well as graphite or molybdenum disulfide can be used as lubricant fillers in Celcon which is an acetal copolymer, in Delrin which is an acetal monopolymer as well as nylon which is a manufactured fiber of fiber-forming substance having any long chain synthetic polyamide having recurring amide groups as an integral part of the polymer chain. Polycarbonate material such as Lexan or Merlon can also be used as the injection-moldable resin material for the body 21 as well as thermosetting plastics having high corrosion resistance and impact resistance. The fiber particles 22 preferably are of Teflon or polytetrafluoroethylene having a length greater than one thirty-second of an inch and up to a length of substantially three-eighths of an inch such that ends 23 thereof are oriented in a particular direction for higher compressive strength and less "plastic cold flow" than discrete spherical, sintered or plate-like particles which could not be used in the make-up of the subject bearing means. The injection-molded ball stud permits proper dimensioning without a costly grinding or machining operation currently being used on steel ball studs which are subject to corrosion such as rust and oxidation. The resin of the covering means 20 assures sealing of the enlarged end 16 of the stud means 15 against oxidation and corrosion yet provides a wear-resistant bearing surface collectively formed by the oriented ends 23 of fiber particles 22. For the covering means 20 a composition of resin for the body portion 21 is supplanted by 22% or less of Teflon fiber particles 22 having ends 23 oriented therewith.

Recent efforts utilizing Teflon filled nylon for an injection moldable covering on ball stud means have resulted in provision of plastic bearing means engageable against a graphited phenolic molded seat means encountering as little as .0055 inch wear which is comparable to wear of metal against Teflon. However, use of plastic to plastic structure movable as to components thereof yet durable and strong for substantially maintenance-free wear and also shock resistant can permit reduction in cost as to grinding and machining operations as well as prevention of corrosion of a metal bearing surface. There is a considerable saving due to control of dimensional tolerances by molding rather than by machining. Also, there is improved wear resistance in plastic to plastic movable structures over present metal to phenolic ball joints as well as wear comparable to that of metal to Teflon faced phenolic joints. Use of fiber filler materials having low-friction characteristics eliminates need for periodic greasing of a bearing surface relatively inexpensive to make. Weaving of low-friction fiber material such as Teflon as a facing for a bearing surface can result in bonding difficulties as well as unnecessary expense due to excess use of material whereas in accordance with the present invention it is possible to use fiber-like particles which may be mechanically sprayed or flocked or which are electrostatically embedded into the body 21 of resin material subject to injection molding and curing. Orientation of ends 23 can occur mechanically or electrostatically by a swirling in a particular direction. Since the fiber-like particles 22 extend substantially transversely through the resin body 21 and substantially radially toward the enlarged end 16 of the stud means there is an enhancement and strengthening for impact resistance to shock such as encountered in a ball joint means installed on a motor vehicle and the like. Thermosetting materials per se do not provide sufficient impact resistance as a molded ball stud means whereas addition of the fiber-like particles 22 embedded substantially radially and bent transversely with the ends 23 as a bearing surface as noted can contribute to success of plastic to plastic movable structures having wear and shock resistance as well as protection against corrosion in accordance with the present invention.

The covering 20 of injection moldable resin material having fiber-like particles embedded therein with ends thereof forming a curved bearing surface can be movably cooperable with a plastic seat means generally indicated by numeral 26 in views of FIGURES 1 and 3. This seat means 26 is formed by a preform of fibrous material such as cotton, felt or cellulose-like material such as paper 27 impregnated with a mastic means 28 of formaldehyde-condensation products such as phenolic as well as melamine having fiber-like particles 30 embedded transversely therethrough to the preform fabric such that ends 31 of the fiber-like particles form a curved bearing surface 32 engageable by the bearing surface 24. The fiber-like particles 30 are substantially the same as the particles 22 and thus a plastic to plastic bearing means can be provided with corrosion resistance as well as low-friction characteristics and impact strength as well as long wear without need for periodic greasing of the bearing surface.

FIGURE 4 illustrates another bearing seat means generally indicated by numeral 36 which can be used with the injection moldable fiber-filled and lubricant-filled thermoplastic covering 20 on the enlarged end 16 of a ball stud means. This bearing seat means 36 includes a backing or preform body portion 37 of fibrous materials such as cotton, felt and the like adapted to fit complementary to a socket forming portion such as 12 shown in views of FIGURES 1 and 3 and a low-friction plastic material in the form of a curved sheet 38 having perforations or holes 39 radially therein can be mechanically interlocked and held to the preform having an impregnation of formaldehyde-condensation products such as phenolic and melamine therein which oozes radially into the perforations or holes to become firmly and mechanically bonded therewith. The sheet 38 made of low-friction plastic material such as Teflon provides a surface of plastic engageable by complementary surface 24 collectively formed by ends 23 of fiber-like particles mentioned earlier.

Figure 5:
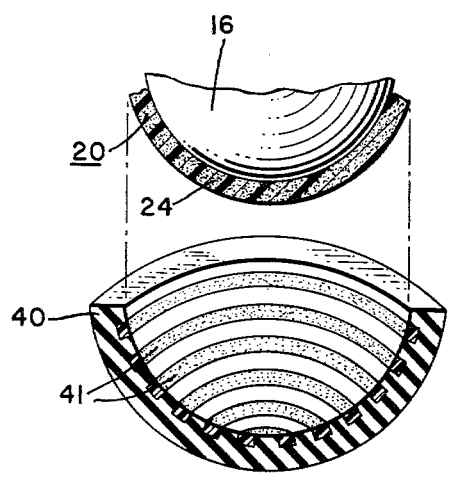
FIGURE 5 is a sectional view of a curved multi-part preform of backing material and concentric ring portions of low-friction plastic bearing seat means engageable by a curved plastic covering molded onto an enlarged end of an elongated metal stud means journalled therewith.

Another plastic seat means illustrated in FIGURE 5 can also be used with the injection moldable resin covering 20 having fiber-like particles 22 with oriented ends 23 embedded therein to form a curved surface 24. This bearing seat means can include a backing portion 40 of curable material which complements a plurality of angular rings 41 that are substantially concentrically located though spaced from each other and that collectively form a plastic bearing surface of polytetrafluoroethylene and the like. This bearing seat means 40–41 can also be fitted to the socket forming portion 12 and the oriented ends 23 of the low-friction plastic fiber particles of the covering 20 can be engageable therewith in accordance with the present invention. Plastic to plastic movable structures can permit mixing and alloying of various plastic materials dissimilar to each other as distinguished from alloying of similar metal materials for metal ball joint structures. Multi-part preforms of backing material having fiber-like particles embedded transversely and radially therewith as well as concentric ring portions can provide a low-friction plastic bearing seat means engageable by a curved plastic covering of injection moldable plastic material also having low-friction particles embedded substantially radially therein.

While the embodiments of the present invention as herein disclosed constitute preferred forms, it is to be understood that other forms might be adopted.

What is claimed is as follows:

A ball joint assembly comprising a ball stud having a substantially spherically shaped ball portion and an elongated stud portion extending therefrom, a two piece metal housing forming a ball joint socket receiving said substantially spherically shaped ball portion, one piece of said housing including a substantially semispherical socket portion and the other housing piece including a semispherical socket portion with a socket continuation surface extending from said one piece semispherical socket portion and terminating in an aperture with said ball stud extending therethrough, said ball portion having a molded layer of resinous material thereon having embedded therein Teflon flock fibers and a powdered lubricant of graphite, molybdenum disulphate and the like, said embedded Teflon flock fibers filling substantially 22% of the resinous material layer with the length of said fibers being between $1/32$ and $3/8$ inch, said Teflon flock fibers having a portion thereof extending from said resinous material bent along the outer periphery of said ball portion so as to follow the curvature thereof to provide a bearing surface of exposed Teflon fibers, said ball joint socket including a bearing seat portion thereon forming a complementary spherical surface for receiving the ball portion of said ball stud, said bearing seat being formed by a backing portion having a layer of resinous material with separate annular spaced concentric rings of Teflon material embedded in the surface thereof which collectively form a bearing surface of Teflon material engaging the exposed Teflon fibers of said ball portion.

References Cited by the Examiner

UNITED STATES PATENTS

| | | | |
|---|---|---|---|
| 1,980,117 | 11/1934 | Turner et al. | 287—87 X |
| 2,695,185 | 11/1954 | Latzen | 287—21 X |
| 2,715,074 | 8/1955 | Hirschberger | 117—17 |
| 2,754,050 | 7/1956 | Wellington. | |
| 2,798,005 | 7/1957 | Love. | |
| 2,908,028 | 10/1959 | Runton et al. | |
| 2,989,352 | 6/1961 | Schmidt. | |
| 2,998,397 | 8/1961 | Reising. | |
| 3,089,198 | 5/1963 | Eirhart | 287—90 X |
| 3,108,830 | 10/1963 | Fierstine | 287—87 |

FOREIGN PATENTS 876,435  8/1961  Great Britain.

CARL W. TOMLIN, *Primary Examiner.*

WALTER A. SCHEEL, *Examiner.*

A. V. KUNDRAT, *Assistant Examiner.*